UNITED STATES PATENT OFFICE.

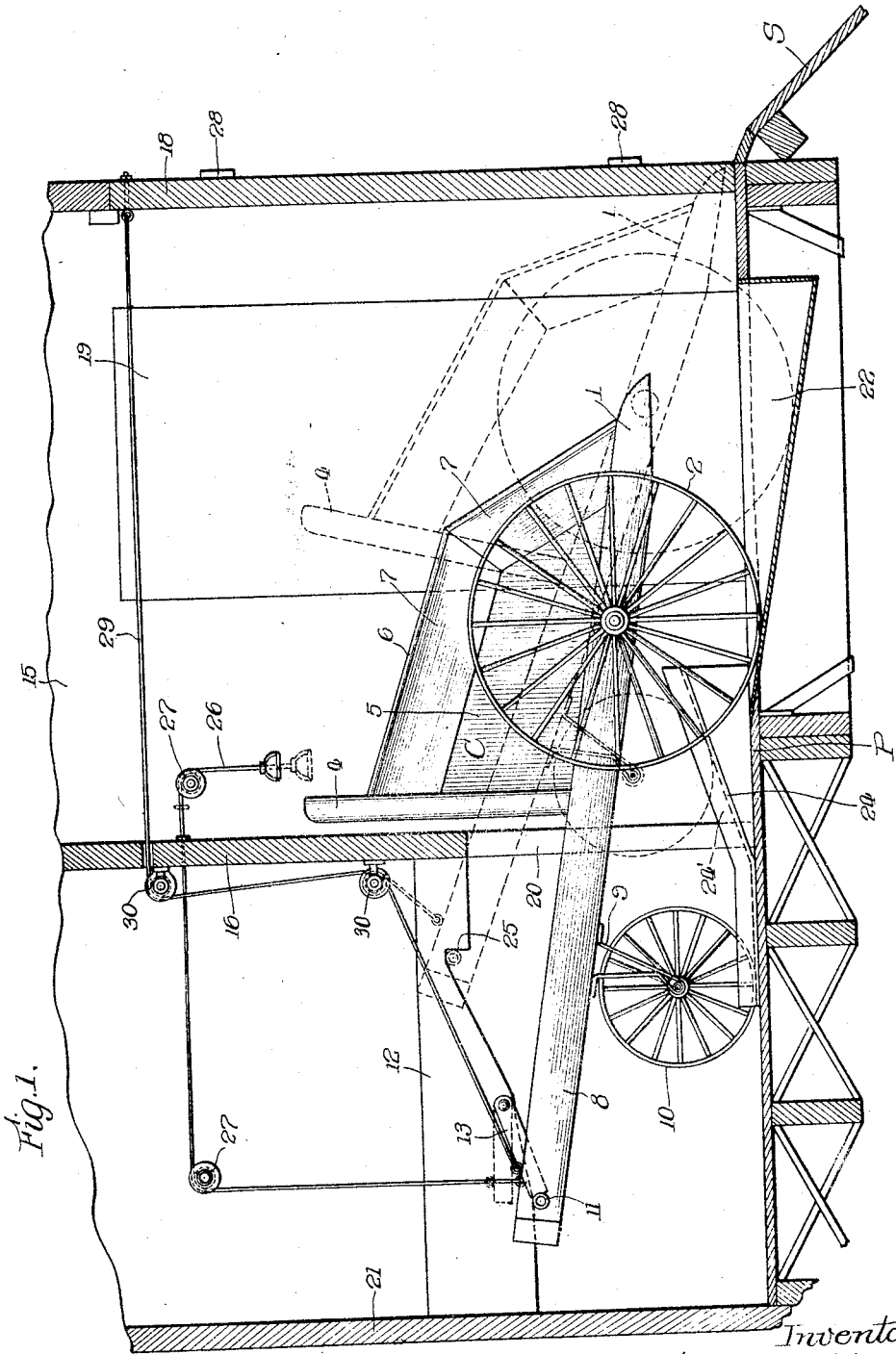

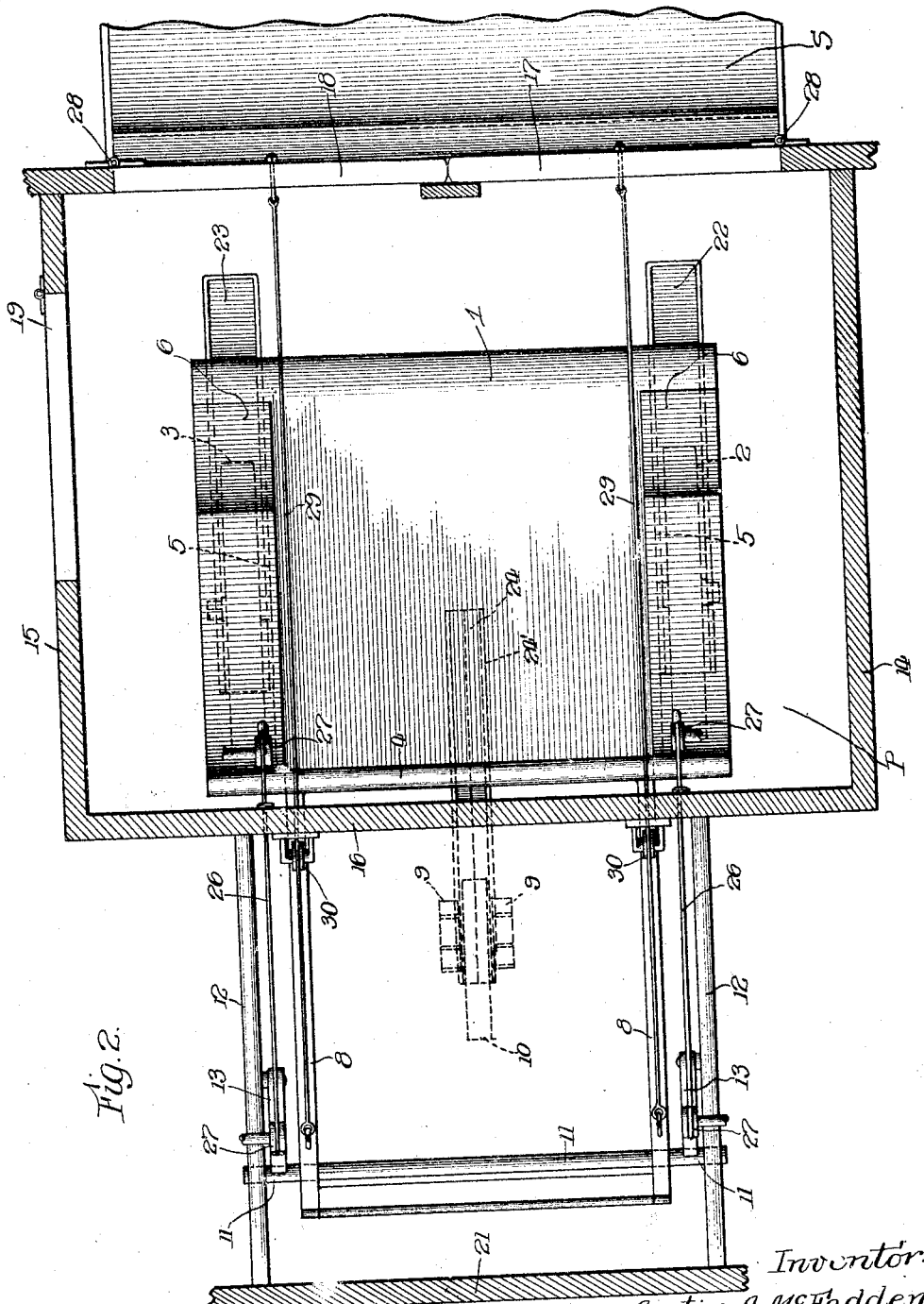

AUSTIN A. McFADDEN, OF GRAND RAPIDS, MICHIGAN.

AMUSEMENT DEVICE.

1,365,419.       Specification of Letters Patent.     Patented Jan. 11, 1921.

Application filed May 27, 1920. Serial No. 384,525.

*To all whom it may concern:*

Be it known that I, Austin A. McFadden, a citizen of the United States, and a resident of Grand Rapids, in the county of Kent and State of Michigan, have invented certain new and useful Improvements in Amusement Devices, of which the following is a specification.

My invention relates to amusement devices for use in parks or other pleasure resorts and pertains to that class of devices in which people are suddenly discharged from a seat structure onto a slide or chute. The object of my invention is to provide an improved seat structure in the form of a dump cart together with improved construction and arrangement for automatically rolling said cart toward the slide or chute and tilting it at the proper moment to discharge the occupants onto the slide or chute.

The various features of construction and arrangement of my invention are disclosed in the structure shown on the accompanying drawings in which—

Figure 1 is a side elevational view of the cart and controlling mechanism, the supporting platform and housing structures being in vertical section;

Fig. 2 is a plan view of the parts shown in Fig. 1.

A platform P forms a part of a building or other structure, and from the edge of this platform extends the slide or chute S of any desired construction. On this platform the cart C is mounted and suitably controlled to convey occupants to the slide and to dump them thereon. This cart comprises a floor structure 1 mounted on wheels 2 and 3. At the inner end of the floor structure rises the back 4 which is at a sufficient distance rearwardly of the front edge of the floor structure to permit persons to sit on the floor structure against the back and with their feet within the front edge of the floor structure. Side walls 5 have the tops or arm rails 6, and preferably guard boards 7 extend downwardly and form with the side walls and arm rails inclosures for receiving the upper sections of the wheels, thus forming guard structures for preventing injury to the cart occupants.

The floor structure 1 has the rearward extension 8 on which brackets 9 support a caster or guide wheel 10. At its rear end the extension 8 has pins 11 extending laterally which coöperate with the under side of the beams 12. These beams also support latch members 13 which are pivoted at their front ends and are normally down in position to be in front of the pins 11 to thereby hold the cart structure in its rear or normal position. I preferably provide an inclosed space for the cart, and as shown this space or room has the side walls 14 and 15 and the rear wall 16, doors 17 and 18, when closed, forming the front wall of the room. In one of the side walls a door 19 is provided through which people enter the room. The cart extension 8 extends through the opening 20 in wall 16 and into the space between this wall and the wall 21, the beams 12 extending between the walls.

Secured in the platform structure are steel track structures 22 and 23 which are inclined downwardly toward the slide, the track structures receiving the wheels 2 and 3 of the cart. On the platform floor is also mounted the track structure 24 which is inclined upwardly and which receives the caster or guide wheel 10. The extent and inclination of the track structures are such that when the cart travels forwardly and downwardly on the track structures 22 and 23 the track structure 24 will coöperate with the wheel 10 to tilt the cart forwardly so that at the end of its travel the front of the cart structure will be at the top of the slide, and the inclination of the cart floor will be such that persons seated in the cart will slide down by the force of gravity onto the slide. During forward travel of the cart the pins 11 engage with the guide surfaces 12' on the under edges of the beams 12, and the pins engage with the stop shoulders 25 to stop the cart when it has reached its front position in register with the slide. The attendant stands in the room in which the cart is and in order to release the cart he pulls on the cord 26 which extends around suitable pulleys 27 and to the latch members 13, pull on the cord causing the latch members to be raised from in front of the pins 11, and the cart, weighted by persons therein will travel down the inclined track structures 22 and 23.

The doors 17 and 18 are preferably on spring hinges 28 or other means are provided which tend to swing the doors open. A cord 29 leads from each door around suitable pulleys 30 and connects with the extension 8 of the cart so that when the cart is shifted rearwardly to its normal position the doors will be closed, and when the cart is released and travels forwardly the doors will be automatically swung open to permit the cart occupants to be deposited onto the slide.

The operation of the amusement device is apparent. Persons usually two at a time travel up suitable stairs (not shown) and enter the cart room through the door 19. The attendant then seats these persons in the cart and pulls cord 26 to release the cart from the latch members 13. The released weighted cart then travels forwardly down the inclined track members 22 and 23 and when the guide wheel 10 encounters the inclined track structure 24 the cart is also tilted. When the pins 11 have reached the stop shoulders 25 the cart will have traveled forwardly and have been tilted its full distance and will be in position shown in dotted line Fig. 1, that is, with its front edge in registration with the slide S, the cart occupants sliding down the increased inclination of the cart floor and onto the slide S. Just before the cart reaches its dumping position the doors 17 and 18 will have been fully opened. After discharge of the occupants the attendant pulls back the cart, and during such rearward movement the doors 17, 18 are closed and the pins 11 travel under the latch members 13 to be eventually in position behind such latch members, the cart being then held in its normal position ready to receive other persons.

The guide surfaces 12' on the beams 12 are arranged to cause the guide wheel 10 to hold the track structure 24, which track structure has also the side flanges 24' for keeping the wheel 10 in the proper path. During travel of the cart down the inclined track structures 22, 23 it acquires some momentum and when the pins 11 strike the shoulders 25 the car will be suddenly stopped and the jar will cause the occupants to be started on their downward journey. My improved mechanism is very simple and effective. The occupants are always fully protected and cannot be injured. Changes and modifications are of course possible which would however still come within the scope of the invention and I do not therefore desire to be limited to the exact construction, arrangement and operation which I have shown and described.

Having described my invention, I claim as follows:

1. In a pleasure device of the class described, the combination of an elevated platform, a slide leading from said platform, a dump cart mounted on said platform, means normally holding said dump cart away from said slide, and means for causing said dump cart to travel toward the slide and to tilt to deposit occupants therefrom onto the slide.

2. In a pleasure structure of the class described, the combination of a platform, a slide leading therefrom, a dump cart on said platform normally held away from said slide and in position to receive and hold occupants, means for propelling said cart to said slide, and means for tilting it to bring it into registration with said slide and to dump the occupants onto said slide.

3. In a pleasure structure of the class described, the combination of a platform, a slide leading downwardly therefrom, a dump cart on said platform, means normally holding said dump cart away from said slide and in position to receive and hold persons, and means for simultaneously moving said cart toward said slide and for inclining it to bring it into position to form a continuation of said slide whereby persons seated on said cart will be dumped therefrom onto said slide.

4. In a pleasure structure of the class described, the combination of a raised platform, a slide leading therefrom, a dump cart on said platform, tracks on said platform for receiving the wheels of said cart, said cart being normally held in position to receive and hold persons, said tracks being inclined to propel said cart toward said slide and to tilt it into registration with said slide whereby persons thereon are dumped onto the slide at the end of travel of said cart.

5. In a pleasure structure of the class described, the combination of an elevated platform, a slide leading therefrom, a dump cart on said platform, means normally holding said dump cart away from said slide and with its floor sufficiently horizontal to retain persons thereon, and inclined tracks adapted upon release of said cart to cause it to travel toward said slide and tilt into registration therewith whereby to dump the cart occupants onto the slide.

6. In a pleasure structure of the class described, the combination of an elevated platform, a slide leading therefrom, a dump cart on said platform, means normally holding said cart away from said slide and with its floor sufficiently horizontal to retain people thereon, inclined tracks adapted upon release of said cart to cause it to travel toward said slide and to tilt into registration therewith, and a stop for abruptly stopping travel of said cart after it has been tilted into registration with said slide whereby the cart occupants are suddenly dumped onto said slide.

7. In a pleasure structure of the class described, the combination of an elevated platform, a slide leading therefrom, a dump cart on said platform, latch mechanism for normally holding said dump cart away from said slide, means for releasing said latch mechanism, a track on said platform inclined toward said slide for receiving the cart wheels, said inclined tracks causing said cart to travel toward said slide after release thereof from the latch mechanism, a wheel under the rear end of said cart, and an upwardly inclined track coöperating with said last mentioned wheel to cause tilting of said cart during forward travel thereof whereby persons seated in the cart will be dumped onto said slide.

8. In a pleasure structure of the class described, the combination of an elevated platform, a slide extending from said platform, a cart on said platform normally in position to receive and retain people, front and rear wheels for said cart, and downwardly and upwardly inclined tracks for said front and rear wheels respectively for causing said cart to travel toward said slide and to be simultaneously tilted into registration with the slide whereby people will be dumped from the cart onto the slide.

9. In discharging mechanism for pleasure structures of the class described, the combination of a platform, a dump cart on said platform, means normally holding said cart away from the end of the platform, means for releasing the cart, and means for automatically causing said cart to travel to the end of the platform and to tilt to deposit occupants therefrom and from the platform.

10. In discharge mechanism for pleasure structures of the class described, the combination of a platform, a dump cart on said platform, tracks on said platform receiving the wheels of said cart, means normally holding said cart at one end of said tracks, means for releasing said cart, said tracks being inclined to cause said cart to travel after release toward the end of the platform and to be simultaneously tilted so that when it reaches the end of the platform its occupants will be discharged from the cart.

In witness whereof, I hereunto subscribe my name this 25th day of May, A. D. 1920.

AUSTIN A. McFADDEN.